(12) United States Patent
Masumoto

(10) Patent No.: US 6,563,545 B1
(45) Date of Patent: May 13, 2003

(54) SYNCHRONOUS PROCESSING CIRCUIT

(75) Inventor: Junji Masumoto, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/647,323

(22) PCT Filed: Jan. 27, 2000

(86) PCT No.: PCT/JP00/00405

§ 371 (c)(1),
(2), (4) Date: Sep. 28, 2000

(87) PCT Pub. No.: WO00/45591

PCT Pub. Date: Aug. 3, 2000

(30) Foreign Application Priority Data

Jan. 29, 1999 (JP) .............................. 11-021910

(51) Int. Cl.[7] .................................................. H04N 5/10
(52) U.S. Cl. ........................................ 348/529; 348/547
(58) Field of Search ................................ 348/525, 529, 348/530, 531, 536, 547, 548, 521, 524; H04N 5/10

(56) References Cited

U.S. PATENT DOCUMENTS

| 5,414,470 A | | 5/1995 | Hotta et al. |
| 5,469,220 A | * | 11/1995 | Kumada .................... 348/529 |
| 5,831,682 A | * | 11/1998 | Iwasaki et al. ............ 348/525 |

FOREIGN PATENT DOCUMENTS

| JP | 60-106274 | 6/1985 |
| JP | 2-92164 | 3/1990 |
| JP | 9-312784 | 12/1997 |
| JP | 10-288972 | 10/1998 |
| JP | 11-4359 | 1/1999 |

* cited by examiner

Primary Examiner—Michael H. Lee
(74) Attorney, Agent, or Firm—Wenderoth, Lind & Ponack, L.L.P.

(57) ABSTRACT

With the present invention, a synchronous processor circuit can be implemented with a simplified circuit by improving a display's synchronization stability, and by setting a pulse width of a vertical synchronizing signal to be integral multiple of the horizontal synchronizing signal.

9 Claims, 18 Drawing Sheets

SYNCHRONOUS PROCESSING CIRCUIT

TECHNICAL FIELD

The present invention relates to synchronous processor circuits in a color receiver and, more specifically, to a synchronous processor circuit for reproducing a synchronizing signal externally provided by a video signal source to a color receiver, and supplying the synchronizing signal to each circuit block in the color receiver.

BACKGROUND ART

FIG. 14 is a block diagram showing the structure of a conventional synchronous processor circuit. In FIG. 14, the synchronous processor circuit includes an LPF 1 to which a composite signal 5 is externally provided, and a vertical synchronization separating signal 6 is separated therefrom and outputted; a phase delay part 2 for receiving the composite signal 5 and outputting a plurality of horizontal synchronizing signals 19 to 24 each differently delayed in phase; and a vertical synchronizing signal reproduction circuit 3 for receiving the plurality of horizontal synchronizing signals 19 to 24 each differently delayed in phase and the vertical synchronization separating signal 6 and outputting a vertical synchronizing signal 8. The phase delay part 2 includes first to sixth phase delay circuits 201 to 206. The LPF is a low pass filter. The operation of this synchronous processor circuit is described next below.

FIG. 15 is a time chart which explains the operation of the conventional synchronous processor circuit. In the upper part of the drawing, t1 to t13 indicate time at a regular interval. To be specific, time t1 to time t13 indicate timing for a horizontal synchronizing signal to rise. As shown in FIG. 15, the composite signal 5 externally provided to a display is a synchronizing signal onto which a vertical synchronizing signal and a horizontal synchronizing signal are superimposed.

In FIG. 15, the horizontal synchronizing signal is a pulse signal which rises every time at times t1 to time t13. The vertical synchronizing signal is a pulse signal which rises at time t4 and falls at time t8. Once inputted into the LPF 1, such composite signal 5 is cut off with any horizontal synchronizing frequency component which is high in frequency. Therefore, the LPF 1 is capable of reproducing the vertical synchronization separating signal 6 with any horizontal synchronizing frequency component subtracted from the composite signal 5.

The composite signal 5 is also provided to each of the first to sixth phase delay circuits 201 to 206 in the phase delay part 2. Those inputted composite signals 5 each generate a pulse corresponding to a period of the horizontal synchronizing signal. By using the pulses corresponding to the period of the horizontal synchronizing signal, the first to sixth phase delay circuits 201 to 206 output horizontal synchronizing signals 19 to 24 varied in phase with a predetermined interval in the corresponding phase delay circuit, respectively. The horizontal synchronizing signals 19 to 24 phase-delayed as such and the vertical synchronization separating signal 6 are provided to the vertical synchronizing signal reproduction circuit 3. The vertical synchronizing signal reproduction circuit 3 outputs the vertical synchronizing signal 8 having the phase relationship with the horizontal synchronizing signal determined.

Next, the vertical synchronizing signal reproduction circuit 3 is described for its structure and operation in detail. FIG. 16 is a diagram showing an exemplary detailed structure of the vertical synchronizing signal reproduction circuit 3. In FIG. 16, the vertical synchronizing signal reproduction circuit 3 includes flip-flops 10 to 13, each of which receives the phase-delayed horizontal synchronizing signal 19, 21, 22, or 24 and the vertical synchronization separating signal 6; a NAND gate 15 which receives signals from the flip-flops 10 and 11; a NAND gate 16 which receives signals from the flip-flops 12 and 13; a set-reset flip-flop 17 in which a signal from the NAND gate 15 goes to the set and a signal from the NAND gate 16 to the reset; a multiplexer 18 which receives a signal from the set-reset flip-flop 17 as a control signal and the phase-delayed horizontal synchronizing signals 20 and 23, and outputs a signal 27 which is either one of the horizontal synchronizing signals; and a flip-flop 14 which receives the vertical synchronization separating signal 6 and the output signal 27 from the multiplexer 18, and outputs the vertical synchronizing signal 8.

In FIG. 16, the flip-flop 14 plays a a role as a latch means for latching a vertical synchronization separating signal, and outputting a synchronizing signal having the phase relationship with the horizontal synchronizing signal determined. The multiplexer 18 plays a role as a signal selection means for selecting, for output, a signal for latching the vertical synchronization separating signal from among a plurality of phase-delayed signals. The flip-flops 10 to 13, the NAND gates 15 and 16, and the set-reset flip-flop 17 play a role as signal selection control means for outputting a signal to control the multiplexer 18 which phase-delayed signal is selected therein. The operation of such structured vertical synchronizing signal reproduction circuit 3 is described next below by referring to FIGS. 16 and 17.

FIG. 17 is a time chart showing the operation of the vertical synchronizing signal reproduction circuit 3 from time t4 to time t5 in FIG. 15. In FIG. 17, a timing (denoted by time tA in the drawing) which coincides with a threshold value between a high level and a low level of the vertical synchronization separating signal 6 is observed between timings for the phase-delayed synchronizing signals 19 and 21 to rise. In such case, as shown in FIG. 17, the output signal from the NAND gate 15 changes in level from high to low with the timing when the phase-delayed horizontal synchronizing signal 21 rises. The signal is a set incoming signal 25 which is inputted into the set terminal of the set-reset flip-flop 17.

Further, in FIG. 17, the timing which coincides with the threshold value between the high level and the low level of the vertical synchronization separating signal 6 is not observed between timings for the phase-delayed horizontal synchronizing signals 22 and 24 to rise. Therefore, as shown in FIG. 17, an output signal 26 from the NAND gate 16 remains in the high level. The signal is a reset incoming signal 26 which is inputted into the reset terminal of the set-reset flip-flop 17.

Once such set incoming signal 25 and reset incoming signal 26 are provided to the set-reset flip-flop 17, as shown in FIG. 17, an output signal 33 from the set-reset flip-flop 17 is fixed in the low level. The output signal 33 from the set-reset flip-flop 17 is provided to a control terminal of the multiplexer 18.

When receiving a signal high in level in the control terminal, the multiplexer 18 selects the phase-delayed horizontal synchronizing signal 20 for output. When a signal low in level is inputted thereto, the multiplexer 18 selects the phase-delayed horizontal synchronizing signal 23 for output. Accordingly, the multiplexer 18 having the signal low in level provided to its control terminal selects and outputs the phase-delayed horizontal synchronizing signal 23.

The phase-delayed horizontal synchronizing signal 23 can assuredly be latched with the vertical synchronization separating signal 6 with the timing which coincides with the threshold value between the high level and low level thereof. This is because, as described in the foregoing, the timing which coincides with the threshold value between the high level and the low level of the vertical synchronization separating signal 6 is observed between the timings for the phase-delayed horizontal synchronizing signals 19 and 21 to rise. Therefore, it is not certain whether the phase-delayed horizontal synchronizing signal 20 between the phase-delayed horizontal synchronizing signals 19 and 21 is capable for latching. Accordingly, the flip-flop 14 can assuredly latch the vertical synchronization separating signal 6 with the help of the phase-delayed horizontal synchronizing signal 23.

In the foregoing, by referring to FIG. 17, it has been exemplarily described the case where the timing which coincides with the threshold value between the high level and the low level of the vertical synchronization separating signal 6 is observed between the phase-delayed horizontal synchronizing signals 19 and 21. Herein, the timing which coincides with the threshold value between the high level and the low level of the vertical synchronization separating signal 6 may be observed between the timings for the phase-delayed horizontal synchronizing signals 22 and 24 to rise. In such case, the multiplexer 18 selects, for output, not the phase-delayed horizontal synchronizing signal 23 but the phase-delayed horizontal synchronizing signal 20. Accordingly, similar to the above-described case, the flip-flop 14 can assuredly latch the vertical synchronization separating signal 6.

In such manner, by receiving the phase-delayed horizontal synchronizing signals 19 to 24 from the phase delay part 2 as signals for detecting the timing which coincides with the threshold value between the high level and the low level of the vertical synchronization separating signal 6, the vertical synchronizing signal reproduction circuit 3 can determine the phase relationship between the vertical synchronizing signal and the horizontal synchronization signals. As such, the vertical synchronizing signal reproduction circuit 3 can assuredly latch the vertical synchronization separating signal 6, and thus can supply, to each digital signal processor circuit arranged in the display, the vertical synchronizing signal 8 which has been accurately reproduced.

According to the conventional synchronous processor circuit structured as such, however, a stabilized vertical synchronizing signal cannot be assuredly obtained if, as shown in FIG. 15, the timings which coincide with the threshold value between the high level and the low level of the vertical synchronization separating signal 6 separated and reproduced by the LPF 1 approximately coincide with both pulse timings of the phase-delayed horizontal synchronizing signals 20 and 23. This is because the phase relationship between the vertical synchronization separating signal 6 and the horizontal synchronizing signal is not determined.

FIG. 18 are diagrams schematically showing a partially-enlarged waveform of the vertical synchronization separating signal 6. A dotted line laterally drawn in the drawings indicates the threshold value between the high level and the low level of the vertical synchronization separating signal 6. To be specific, the threshold value is used by the flip-flops 10 to 14 which receive the vertical synchronization separating signal 6 to distinguish the level thereof between high and low.

FIG. 18(a) is the diagram schematically showing the waveform at a front part of the vertical synchronization separating signal 6 in the range between time t4 and time t5 in FIG. 11. In the drawing, tA indicates a time when the vertical synchronization separating signal 6 reaches the threshold value as in FIG. 17. In the drawing, Ts indicates a period between time t4 and time tA. FIG. 18(b) is the diagram schematically showing the waveform at a rear part of the vertical synchronization separating signal 6 in the range between time t8 and time t9 in FIG. 11. In the drawing, tB indicates a time when the vertical synchronization separating signal 6 reaches the threshold value. In the drawing, Te indicates a period between time t8 and time tB.

As shown in FIG. 18, the waveform of the vertical synchronization separating signal 6 often differs in shape between the front part and the rear part, and the timings tA and tB which coincide with the threshold value between the high level and the low level of the vertical synchronization separating signal 6 often differ between the front part and the rear part thereof. Therefore, at the rear part of the vertical synchronization separating signal 6, unlike the above-described case in FIG. 17, the timing which coincides with the threshold value between the high level and the low level of the vertical synchronization separating signal 6 may be observed between the timings for the phase-delayed horizontal synchronizing signals 22 and 24 to rise. If this is the case, the multiplexer 18 may select, for output, the phase-delayed horizontal synchronizing signal 20, or the phase-delayed horizontal synchronizing signal 23. Consequently, the output signal 27 from the multiplexer 18 fails to be constant in horizontal synchronizing frequency as shown in FIG. 15. As such, according to the conventional structure, the phase relationship between the vertical synchronization separating signal 6 and the horizontal synchronizing signal is not determined. Therefore, the vertical synchronization signal provided therefrom cannot be stabilized enough.

Further, in such a case as shown in FIG. 15, as to the vertical synchronizing signal provided by the vertical synchronizing signal reproduction circuit 3, a pulse width thereof does not become integral multiple of the horizontal synchronizing signal. Consequently, the synchronous processor circuit in the display becomes complicated in structure, thereby rendering the cost increased.

Especially, such phenomenon often occurs in a multiscan monitor, which receives incoming signals varied in scanning frequency from a video signal source. Generally, the LPF 1 is fixed in cutoff frequency. Therefore, the cutoff frequency of the LPF 1 may be too heavy (to low) for the vertical synchronizing signal component superimposed on the composite signal 5 depending on its pulse width. If this is the case, the vertical synchronization separating signal 6 provided by the LPF1 may get very blunt. As exemplarily shown in FIG. 18, the vertical synchronization separating signal 6 provided by the LPF1 shows a gradual change from time t8 to time t9, or from time t4 and time t5. As a result, as described in the foregoing, the timings which coincide with the threshold value between the high level and the low level of the vertical synchronization separating signal 6 approximately coincide with both pulse timings of the above-described phase-delayed horizontal synchronizing signals 20 and 23, thereby causing such problem as above-described.

Therefore, an object of the present invention is to provide a synchronous process circuit capable of improving a display's synchronization stability by determining a phase relationship between a vertical synchronizing signal and horizontal synchronizing signals, and a circuitry structure of which can be simplified by setting a pulse width of the vertical synchronizing signal to be the integral multiple of the horizontal synchronizing signal.

DISCLOSURE OF THE INVENTION

A first aspect of the present invention is directed to a synchronous processor circuit arranged in a display for reproducing a synchronizing signal from a composite signal provided by a video signal source for stabilizing synchronization in the display, the circuit comprising:
- a low pass filter for outputting a vertical synchronization separating signal by separating a vertical synchronizing signal from the composite signal;
- a frequency divider circuit for outputting a vertical phase detection signal obtained by frequency-dividing the vertical synchronization separating signal into 1/n (where n is multiple of 2);
- a plurality of phase delay circuits for outputting phase-delayed signals each differently delayed in phase with respect to a horizontal synchronizing signal included in the composite signal; and
- a vertical synchronizing signal reproduction circuit for outputting the synchronizing signal having a phase relationship with the horizontal synchronizing signal determined by receiving the vertical synchronization separating signal, the vertical phase detection signal, and the plurality of phase-delayed signals.

As described above, in the first aspect of the present invention, it becomes possible to determine the phase relationship between the vertical synchronizing signal and the horizontal synchronizing signal. Accordingly, the stabilized vertical synchronizing signal can be supplied to each circuit arranged in the display.

According to a second aspect of the present invention, in the first aspect of the present invention,
the frequency divider circuit outputs the vertical phase detection signal obtained by dividing the vertical synchronizing signal into ½.

As described above, in the second aspect of the present invention, it becomes possible to swiftly respond to any minute change in phase of the incoming composite signal by having the ½ frequency divider circuit provided. Accordingly, the stabilized vertical synchronizing signal can be supplied to each circuit arranged in the display.

According to a third aspect of the present invention, in the first aspect of the present invention,
the vertical synchronizing signal reproduction circuit comprises:
- latch means for latching the vertical synchronization separating signal, and outputting the synchronizing signal having the phase relationship with the horizontal synchronizing signal determined;
- signal selection means for selecting a signal to be used by the latch means to latch the vertical synchronization separating signal from among the plurality of phase-delayed signals for output to the latch means; and
- signal selection control means for receiving the vertical phase detection signal and the plurality of phase-delayed signals, and outputting, to the signal selection means, a signal for controlling the signal selection control means which of the phase-delayed signals is selected therein.

As described above, according to the third aspect of the present invention, the phase relationship between the vertical synchronizing signal and the horizontal synchronizing signal can be determined with the help of a plurality of phase-delayed signals inputted as signals for detecting a timing which coincides with the threshold value between the high level and the low level of the vertical synchronization separating signal.

According to a fourth aspect of the present invention, in the first aspect of the present invention,
the synchronous processor circuit further comprises a pulse width reproduction circuit for receiving the signal from the vertical synchronizing signal reproduction circuit, and reproducing the synchronizing signal having a predetermined pulse width.

As described above, according to the fourth aspect of the present invention, as long as the reference timing is stabilized, regardless of the other timing's stability, the stabilized vertical synchronizing signal can be outputted with the counting operation carried out according to the set pulse width.

According to a fifth aspect of the present invention, in the fourth aspect of the present invention,
the pulse width reproduction circuit comprises:
- a counter, in which a counter value is set to 0 when the signal provided by the vertical synchronizing signal reproduction circuit rises, for incrementing the counter value according to an incoming clock signal; and
- a comparator for comparing pulse width setting data provided to set the pulse width and the counter value, and outputting a signal whose pulse width is based on the pulse width setting data.

As described above, in the fifth aspect of the present invention, the pulse width reproduction circuit can output the stabilized signal according to the pulse width which is previously set or calculated by operation.

A sixth aspect of the present invention is directed to a synchronous processor circuit arranged in a display for reproducing a synchronizing signal from a composite signal provided by a video signal source for stabilizing synchronization in the display, the circuit comprising:
- a low pass filter for outputting a vertical synchronization separating signal by separating a vertical synchronizing signal from the composite signal;
- a plurality of phase delay circuits for outputting phase-delayed signals each differently delayed in phase with respect to a horizontal synchronizing signal included in the composite signal; and
- a vertical synchronizing signal reproduction circuit for outputting a signal having the phase relationship with the horizontal synchronizing signal determined by receiving the vertical synchronization separating signal, and the plurality of phase-delayed signals; and
- a flip-flop for latching the signal provided by the vertical synchronizing signal reproduction circuit, and outputting the synchronizing signal whose period is an integral multiple of the horizontal synchronizing signal.

As described above, in the sixth aspect of the present invention, it is possible to obtain the vertical synchronizing signal having the pulse width of the integral multiple of the horizontal synchronizing signal with a structurally simplified circuit. Accordingly, the synchronous processor circuit in the display can be simplified in structure.

According to a seventh aspect of the present invention, in the sixth aspect of the present invention,
the vertical synchronizing signal reproduction circuit comprises:
- latch means for latching, and outputting the synchronizing signal having the phase relationship with the horizontal synchronizing signal determined;
- signal selection means for selecting a signal to be used by the latch means to latch the vertical synchronization separating signal from among the plurality of phase-delayed signals for output to the latch means; and signal selection control means for receiving the vertical phase detection signal and the plurality of phase-delayed signals, and outputting, to the signal selection means, a signal for controlling the signal selection control means which of the phase-delayed signals is selected therein.

As described above, in the seventh aspect of the present invention, the phase relationship between the vertical synchronizing signal and the horizontal synchronizing signal can be determined with the help of a plurality of phase-delayed signals inputted as signals for detecting a timing which coincides with the threshold value between the high level and the low level of the vertical synchronization separating signal.

According to an eighth aspect of the present invention, in the sixth aspect of the present invention, the synchronous processor circuit further comprises a pulse width reproduction circuit for receiving the signal from the flip-flop, and reproducing the synchronizing signal having a predetermined pulse width.

As described above, in the eighth aspect of the present invention, as long as the reference timing is stabilized, regardless of the other timing's stability, the stabilized vertical synchronizing signal can be outputted with the counting operation carried out according to the set pulse width. Therefore, with a structurally simplified circuit, even with respect to the interlace signal, the vertical synchronizing signal can have the pulse width of the integral multiple of the horizontal synchronizing signal. Therefore, it becomes possible to simplify the synchronous processor circuit in the display.

According to a ninth aspect of the present invention, in the eighth aspect of the present invention, the pulse width reproduction circuit comprises:
a counter, in which a counter value is set to 0 when the signal provided by the flip-flop rises, for incrementing the counter value according to an incoming clock signal; and
a comparator for comparing pulse width setting data provided to set the pulse width and the counter value, and outputting a signal whose pulse width is based on the pulse width setting data.

As described above, in the ninth aspect of the present invention, the pulse width reproduction circuit can output the stabilized signal according to the pulse width which is previously set or calculated by operation.

BEST MODE FOR CARRYING OUT THE INVENTION (First Embodiment)

Figure 1:
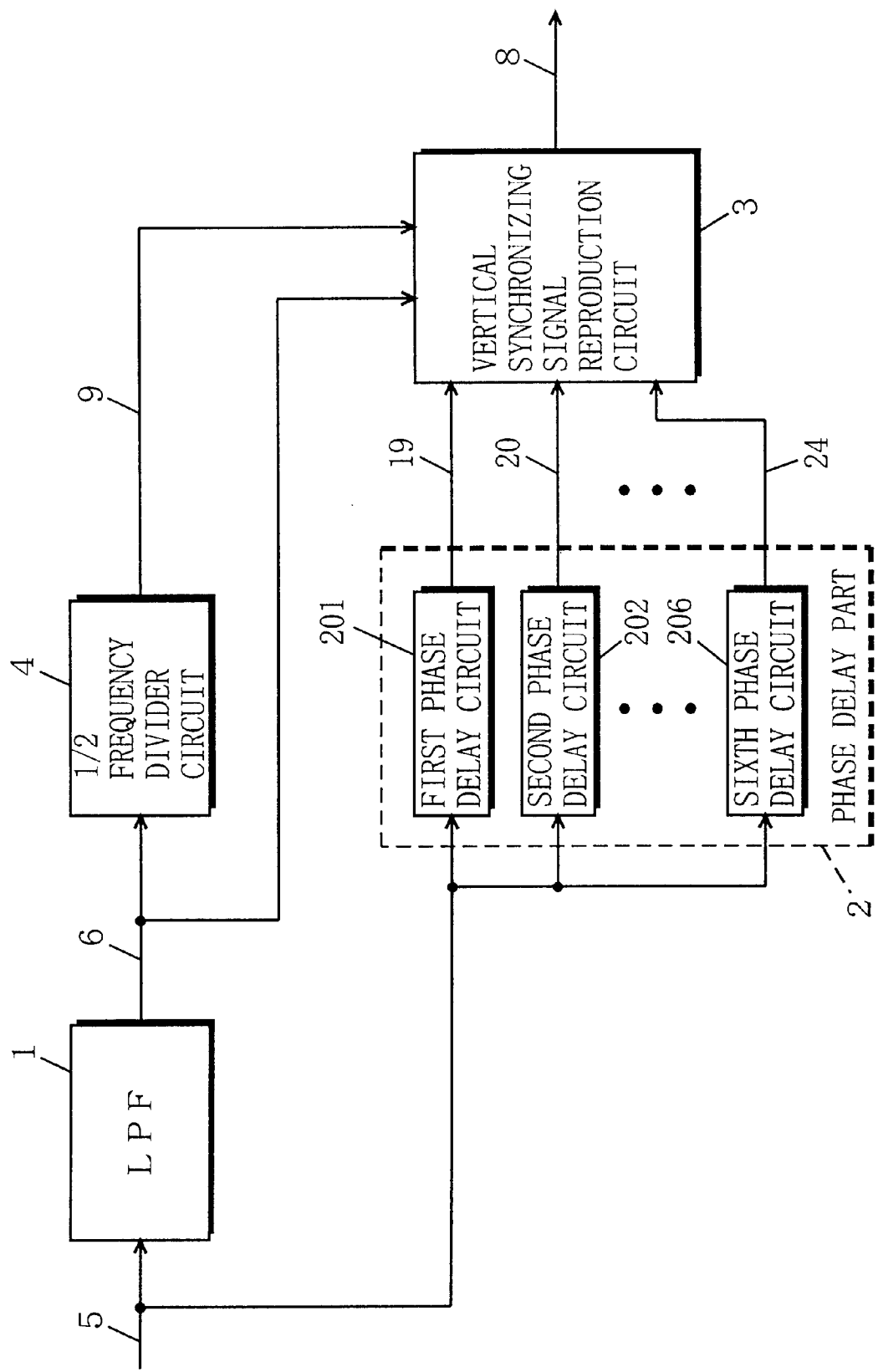
FIG. 1 is a block diagram showing the structure of a synchronous processor circuit in a first embodiment of the present invention.

FIG. 1 is a block diagram showing the structure of a synchronous processor circuit according to a first embodiment of the present invention. In FIG. 1, the synchronous processor circuit includes the LPF 1 to which the composite signal 5 is externally provided, and the vertical synchronization separating signal 6 is separated therefrom for output; a ½ frequency divider circuit 4 for receiving the vertical synchronization separating signal 6 and subjecting the signal to ½ frequency division to output a vertical phase detection signal 9; the phase delay part 2 for receiving the composite signal 5 and outputting the plurality of horizontal synchronizing signals 19 to 24 each differently delayed in phase; and the vertical synchronizing signal reproduction circuit 3 for receiving the plurality of phase-delayed horizontal synchronizing signals 19 to 24, the vertical synchronization separating signal 6, and the vertical phase detection signal 9, and outputting the vertical synchronizing signal 8. The phase delay part 2 includes the first to sixth phase delay circuits 201 to 206. The operation of the synchronous processor circuit is described next below.

Figure 2:
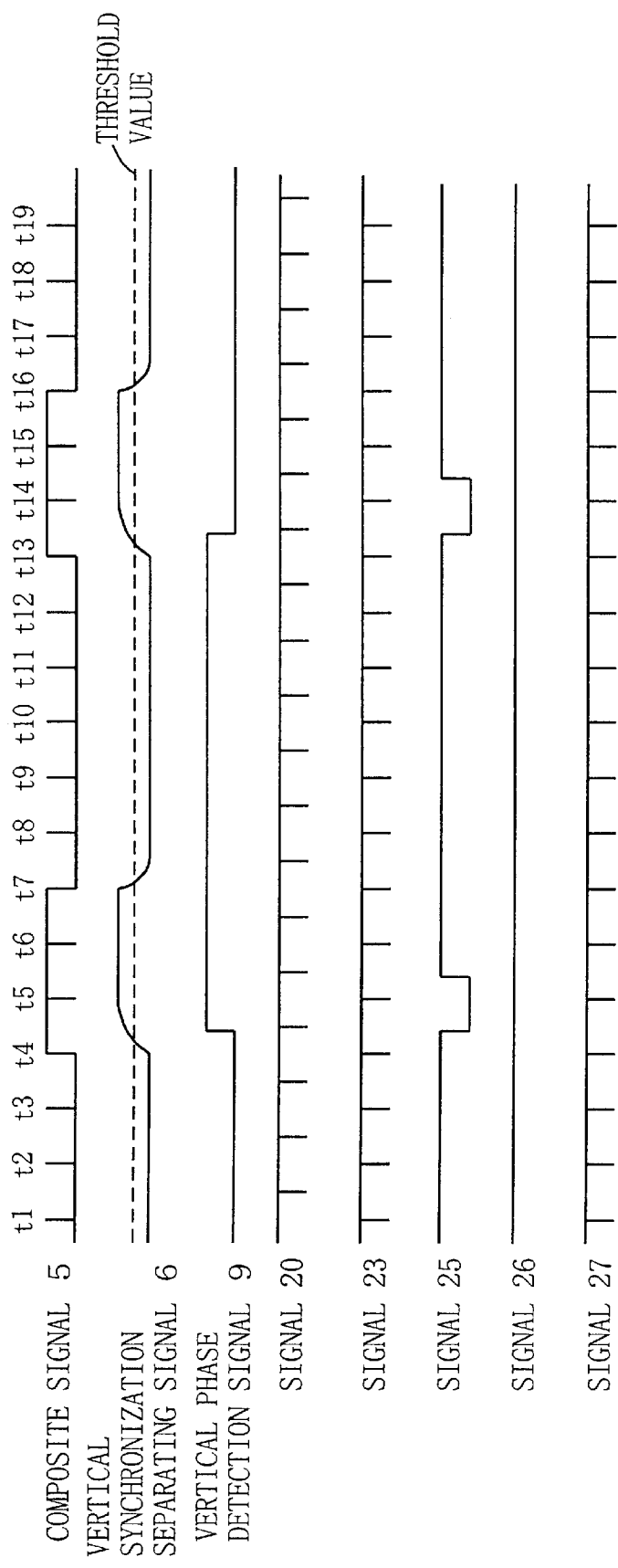
FIG. 2 is a time chart which explains the operation of a vertical synchronizing signal reproduction circuit in the first embodiment of the present invention.

FIG. 2 is a time chart which explains the operation of the synchronous processor circuit according to the first embodiment of the present invention. In the upper part of the drawing, t1 to t19 indicate time at a regular interval. To be specific, time t1 to time t19 indicate timings for a horizontal synchronizing signal to rise.

Figure 15:
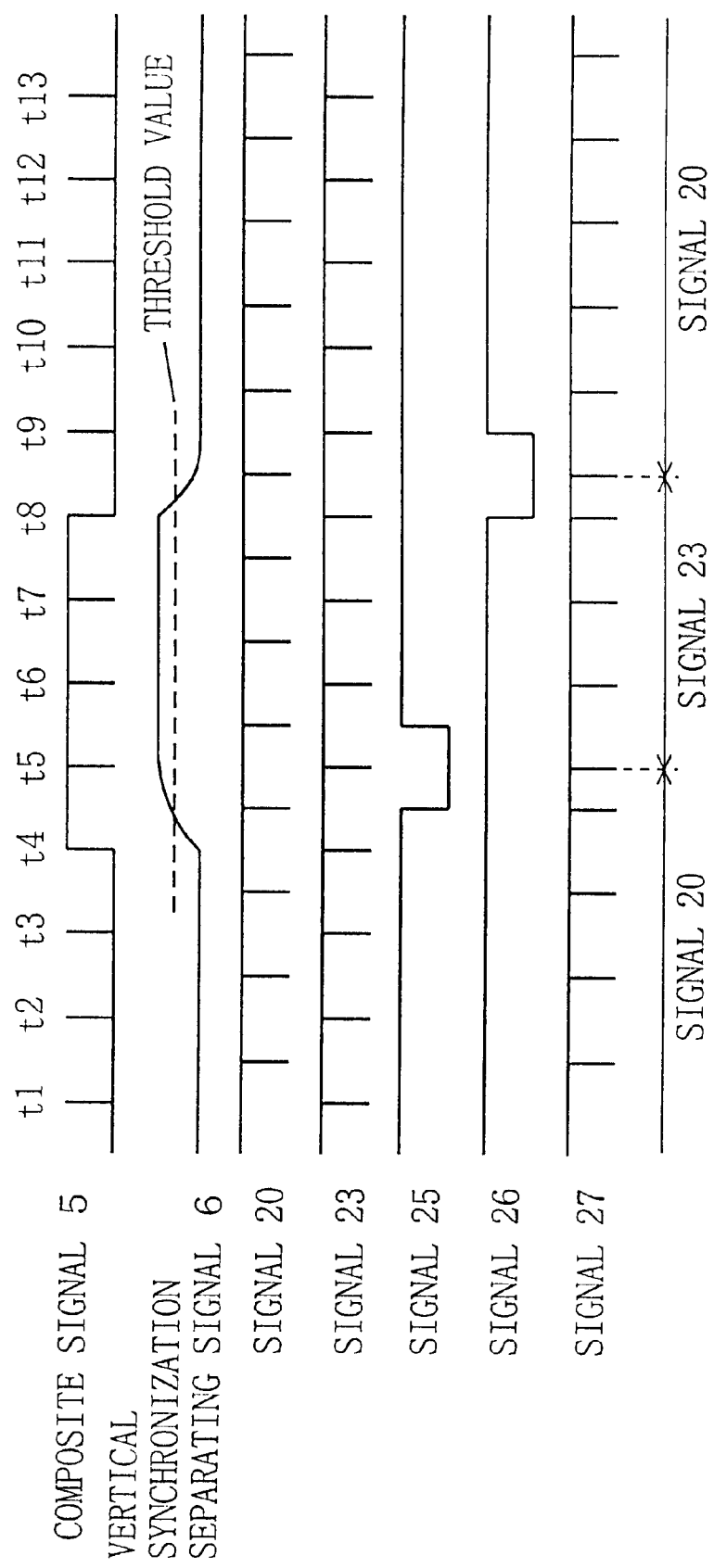
FIG. 15 is a time chart which explains the operation of the conventional synchronous processor circuit.

In FIG. 2, similarly in FIG. 15, the horizontal synchronizing signal is a pulse signal which rises every time at times t1 to t19. The vertical synchronizing signal is a pulse signal which rises at times t4 and t13 and falls at times t8 and t16.

As shown in FIG. 2, the composite signal 5 externally provided to a display is a synchronizing signal onto which the vertical synchronizing signal and the horizontal synchronizing signal are superimposed. Once provided to the LPF 1, such composite signal 5 is cut off with any horizontal frequency component high in frequency. Therefore, the LPF 1 is capable of reproducing the vertical synchronization separating signal 6 with any horizontal synchronizing frequency component subtracted from the composite signal 5. The vertical synchronization separating signal 6 then is provided to the ½ frequency divider circuit 4 to be divided into ½, and is outputted as the vertical phase detection signal 9.

The composite signal 5 is also provided to each of the first to sixth phase delay circuits 201 to 206 in the phase delay part 2. Those inputted composite signals 5 each generate a pulse corresponding to a period of the horizontal synchronizing signal. By using the pulses corresponding to the period of the horizontal synchronizing signal, the first to sixth phase delay circuits 201 to 206 output the horizontal synchronizing signals 19 to 24 each varied in phase with a predetermined interval, respectively.

The horizontal synchronizing signals 19 to 24 phase-delayed as such, the vertical synchronization separating signal 6, and the vertical phase detection signal 9 are all provided to the vertical synchronizing signal reproduction circuit 3. The vertical synchronizing signal reproduction circuit 3 outputs the vertical synchronizing signal 8 having the phase relationship with the horizontal synchronizing signal determined.

Figure 3:
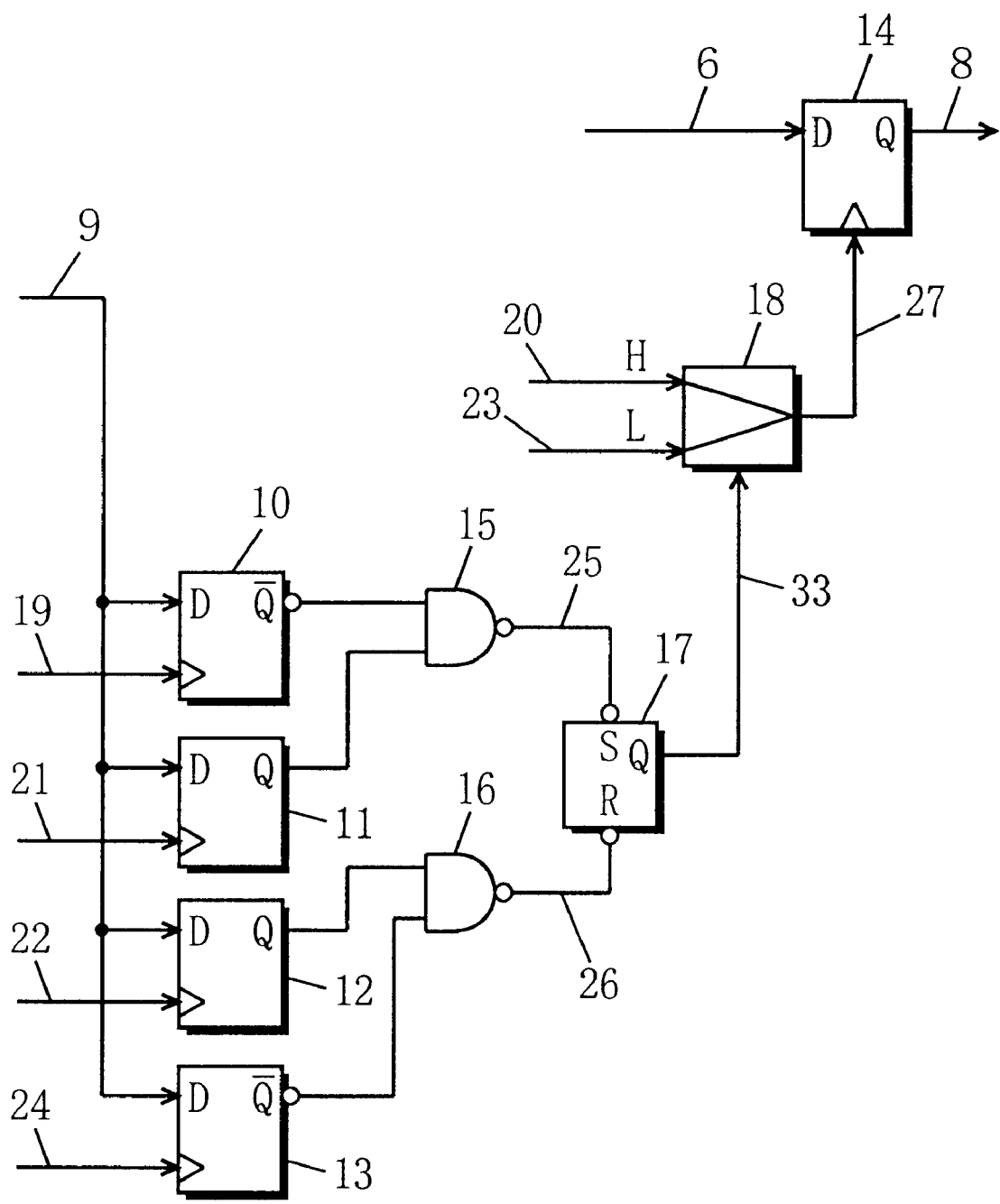
FIG. 3 is a block diagram showing the structure of the vertical synchronizing signal reproduction circuit in the first embodiment of the present invention.

Next, the vertical synchronizing signal reproduction circuit 3 is described for its structure and operation in detail. FIG. 3 is a diagram showing an exemplary detailed structure of the vertical synchronizing signal reproduction circuit 3 of the first embodiment. In FIG. 3, the vertical synchronizing signal reproduction circuit 3 has almost the same structure as the vertical synchronizing signal reproduction circuit 3 in FIG. 16. Accordingly, also for the vertical synchronizing signal reproduction circuit 3 in FIG. 3, the flip-flop 10 plays a role as latch means for latching a vertical synchronization separating signal, and outputting a synchronizing signal having the phase relationship with a horizontal synchronizing signal determined. The multiplexer 18 plays a role as signal selection means for selecting, for output, a signal for latching the vertical synchronization separating signal from among a plurality of phase-delayed signals. The flip-flops 10 to 13, the NAND gates 15 and 16, and the set-reset flip-flop 17 play a role as signal selection control means for outputting a signal to control the multiplexer 18 which phase-delayed signal is selected therein.

Figure 16:
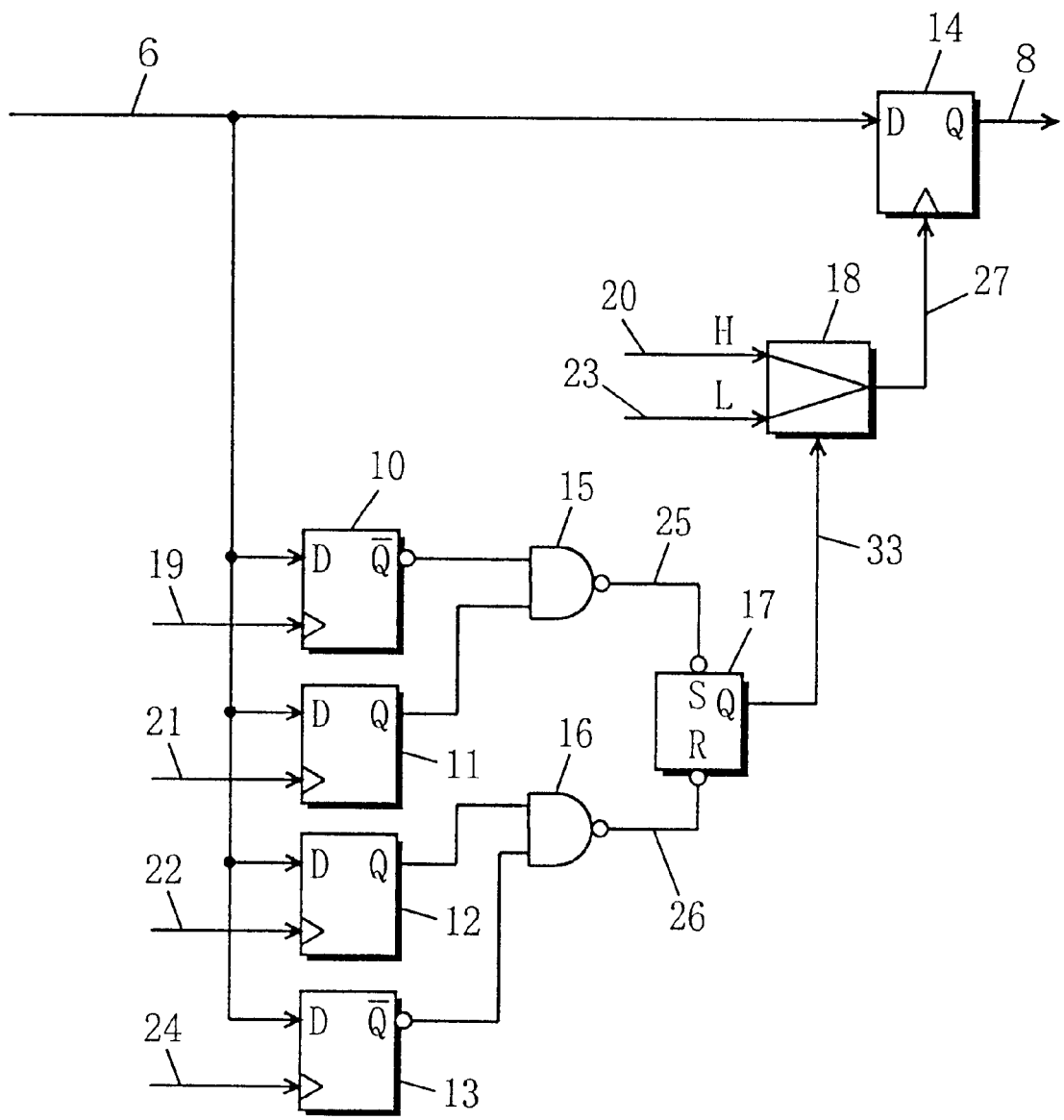
FIG. 16 is a block diagram showing the structure of a conventional vertical synchronizing signal reproduction circuit.

Note herein that, the vertical synchronizing signal reproduction circuit 3 in FIG. 3 is different from the one in FIG. 16 in that the flip-flops 10 to 13 are not provided with the vertical synchronization separating signal 6 but the vertical phase detection signal 9.

Figure 5:
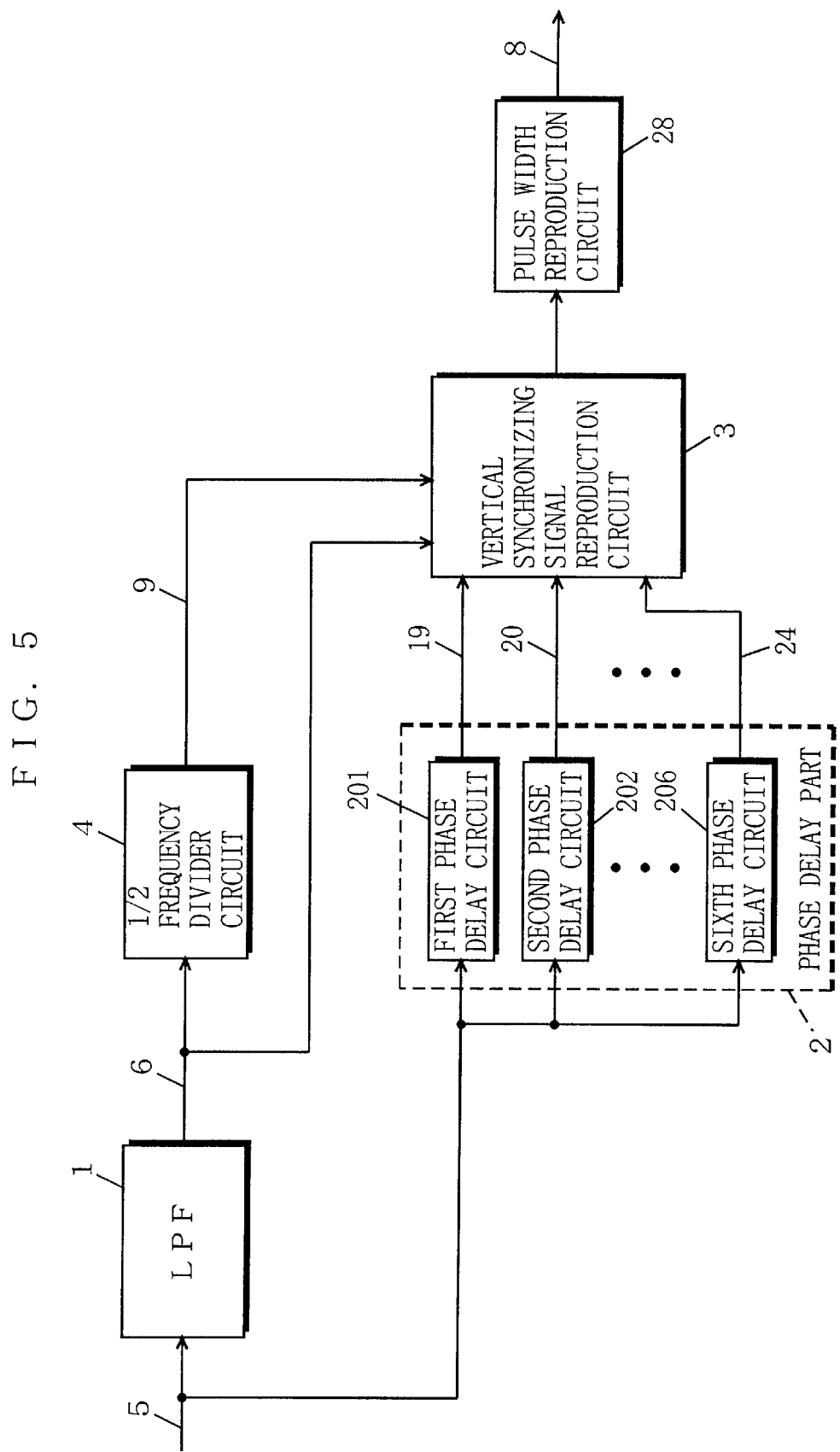
FIG. 5 is a block diagram showing the structure of a synchronous processor circuit in a second embodiment of the present invention.

The operation of such structured vertical synchronizing signal reproduction circuit 3 is described by referring to FIG. 5. The operation of any component in FIG. 3 identical to that in the vertical synchronizing signal reproduction circuit 3 is not described again.

Figure 4:
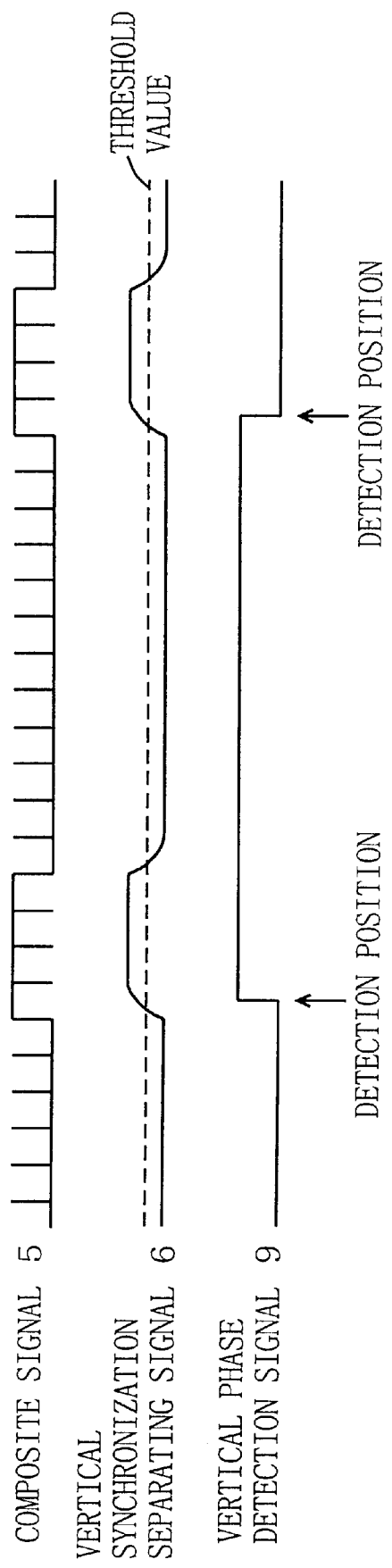
FIG. 4 is a time chart which explains the operation of the synchronous processor circuit in the first embodiment of the present invention.

In FIG. 5, the composite signal 5 onto which the horizontal synchronizing signal and the vertical synchronizing signal are superimposed is provided to the LPF1. The LPF1 outputs the vertical synchronization separating signal 6 as shown in FIG. 4 through separation. This vertical synchronization separating signal 6 is provided to the ½ frequency divider circuit 4. The ½ frequency divider circuit 4 outputs the vertical phase detection signal 9 whose level shows change only with either one of the timings which coincide with the threshold value between the high level and the low level of the vertical synchronization separating signal 6 as shown in FIG. 4.

Figure 18A:
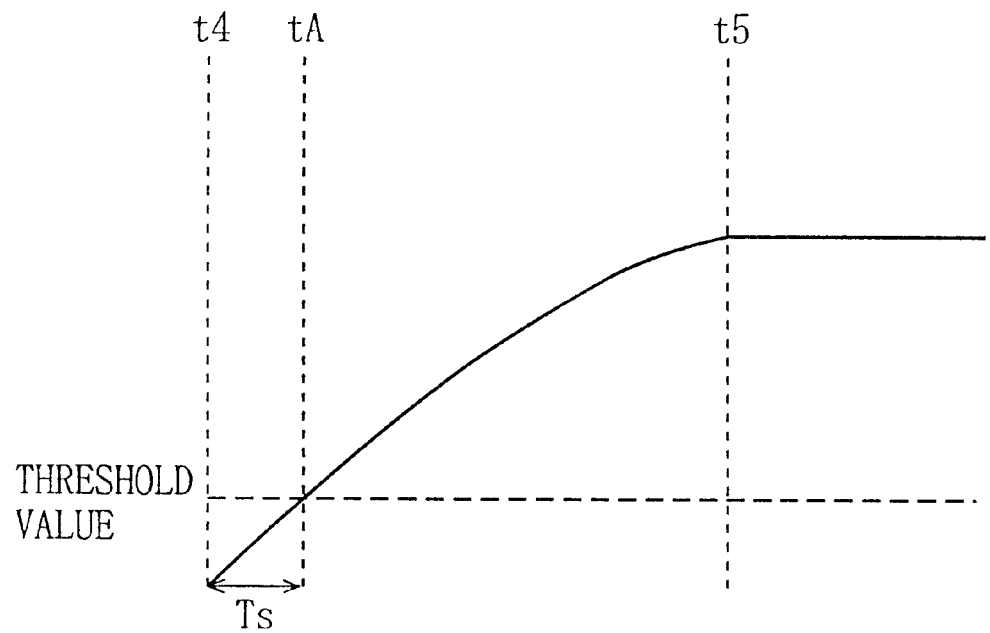
FIG. 18 are diagrams schematically showing a partial-enlarged waveform of a vertical synchronization separating signal 6.
Figure 18B:
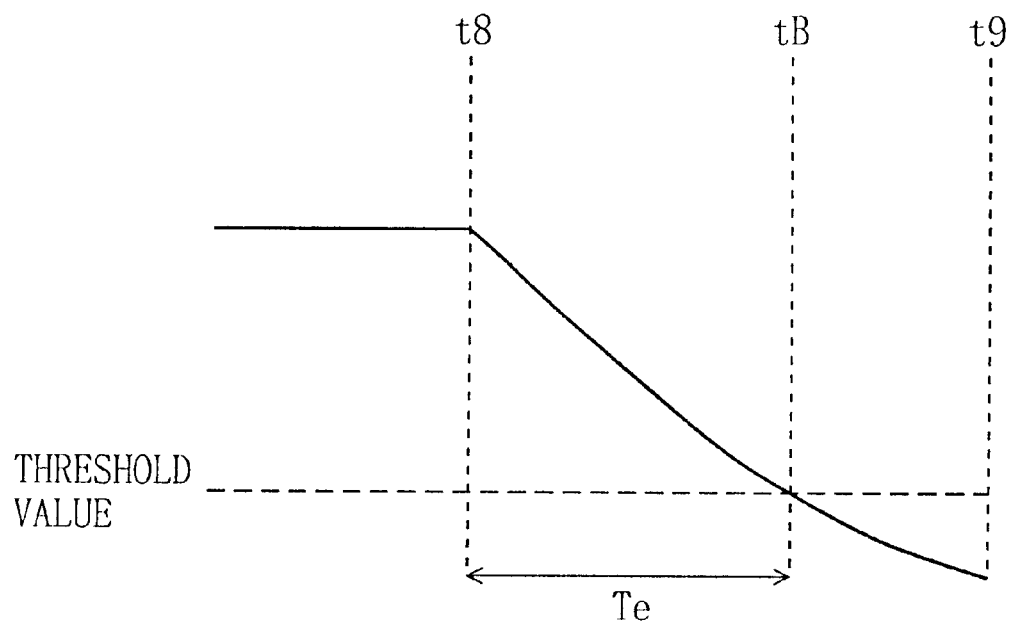

The vertical phase detection signal 9 is provided to the flip-flops 10 to 13 arranged in the vertical synchronizing signal reproduction circuit 3 in FIG. 3. As shown in FIG. 18, as above described, the timings which coincide with the threshold value between the high level and the low level of the vertical synchronization separating signal 6 may differ between at the front part and the rear part thereof. With the above-described structure, however, the vertical phase detection signal 9 only shows change in level with either timing which coincides with the front part or the rear part of the vertical synchronization separating signal 6. Accordingly, as shown in FIG. 2, the output signal 27 from the multiplexer 18 is fixed to either the phase-delayed horizontal synchronizing signal 20 or 23, thereby becoming always constant.

Figure 17:
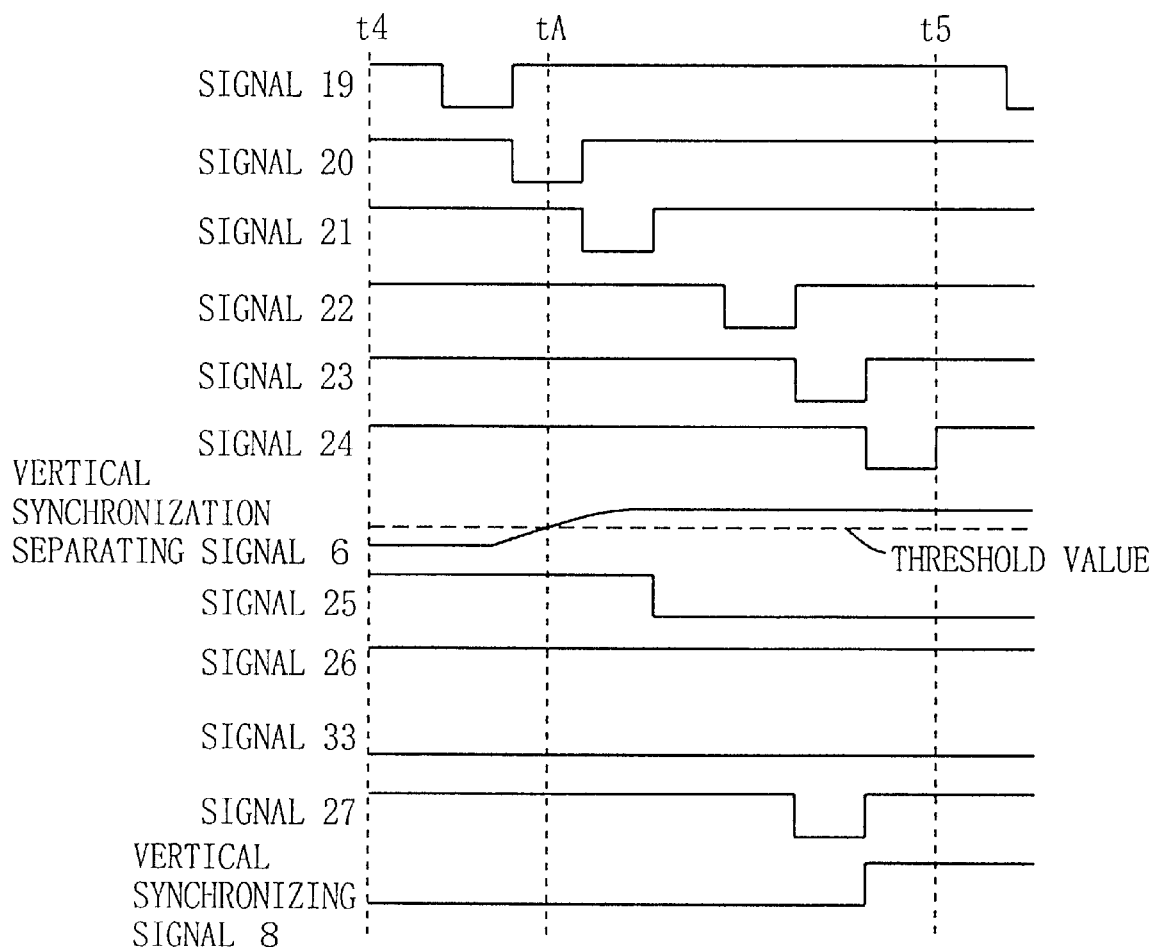
FIG. 17 is a time chart which explains the operation of the conventional vertical synchronizing signal reproduction circuit.

In order to achieve such structure in which the output signal 27 from the multiplexer 18 is fixed to either the phase-delayed horizontal synchronizing signal 20 or 23 to be always constant, for example, either the set incoming signal or reset incoming signal to the flip-flop 17 in FIG. 3 may be put invalid. Although being fixed to the phase-delayed horizontal synchronizing signal 23 in FIG. 2, the output signal 27 from the multiplexer 18 is surely fixable to the phase-delayed horizontal synchronizing signal 20 depending on the waveform or the threshold value of the vertical synchronization separating signal 6. Therefore, setting the set incoming signal or the reset incoming signal to the flip-flop 17 in FIG. 17 invalid is not enough to output the vertical synchronizing signal 8 whose phase can be determined with respect to the horizontal synchronizing signal.

As is known from the above, according to the structure of the synchronous processor circuit of this embodiment, the phase of the vertical synchronizing signal can be determined by the horizontal synchronizing signals, whereby the stabilized vertical synchronizing signal can be supplied to each circuit arranged in the display.

Herein, in this embodiment, the ½ frequency divider circuit is included in the structure to generate the vertical phase detection signal which varies in level with either one of the timings which coincide with the threshold value between the high level and the low level of the vertical synchronization separating signal 6. However, instead of the ½ frequency divider circuit, a 1/n (where n is multiple of 2) frequency divider circuit such as ¼ frequency divider circuit leads to similar effects. Therefore, the frequency divider circuit in this embodiment is not limited to the ½ frequency divider circuit. Note herein that, if n is set too large, it becomes difficult to respond to any minute change in phase of the composite signal 5. Accordingly, needless to say, n has its own limitation in value.

(Second Embodiment)

FIG. 5 is a block diagram showing the structure of a synchronous processor circuit according to a second embodiment of the present invention. The synchronous processor circuit in FIG. 5 is structurally almost the same as the above-described synchronous processor circuit in FIG. 1. Note herein that, only difference between the synchronous processor circuit in FIG. 5 and the one in FIG. 1 is that a pulse width reproduction circuit 28 which receives the output signal from the vertical synchronizing reproduction circuit 3 is additionally provided. Therefore, any identical constituent is under the same reference numeral, and is not described again.

Herein, the pulse width reproduction circuit 28 newly provided in this embodiment is described. In the synchronous processor circuit according to the first embodiment of the present invention, the vertical synchronizing signal reproduction circuit 3 uses the vertical phase detection signal 9 to obtain the vertical synchronizing signal 8 with reference only to one timing coinciding with the threshold value between the high level and the low level of the vertical synchronization separating signal 6. In FIG. 2, the timing referred to for obtaining the vertical synchronizing signal 8 is the one coinciding with the threshold value at the front part of the vertical synchronization separating signal 6.

Figure 6:
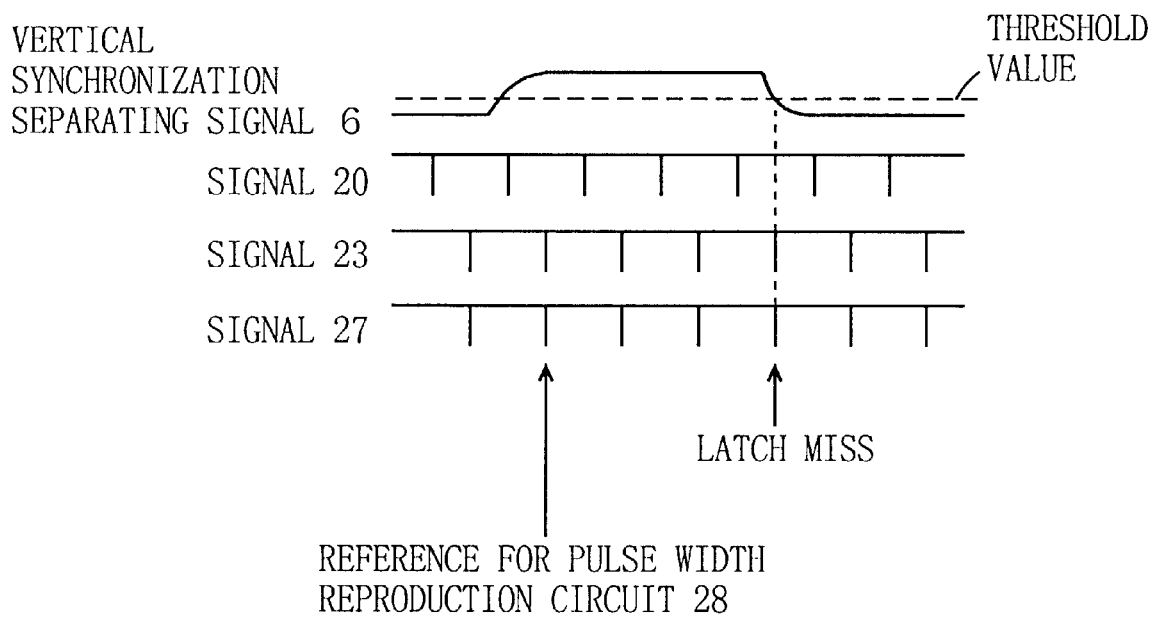
FIG. 6 is a time chart which explains the operation of the synchronous processor circuit in the second embodiment of the present invention.

With such structure, if the output signal 27 from the multiplexer 18 is used to latch not with the referred timing but with the timing on the other side (at the rear part of the vertical synchronizing separating signal 6 in FIG. 2) which coincides with the threshold value between the high level and the low level, a latch miss may be occurred. FIG. 6 is a timing chart showing a case where such latch miss is occurred.

As shown in FIG. 6, in the synchronous processor circuit of the first embodiment, latching can be assuredly carried out at the front part of the vertical synchronization separating signal 6 but is not assured for the rear part thereof. Such latch miss may degrade the display's synchronization stability.

Therefore, the synchronous processor circuit of this embodiment, as shown in FIG. 5, is so structured that the output from the vertical synchronizing signal reproduction circuit 3 goes to the pulse width reproduction circuit 28. This pulse width reproduction circuit 28 is structured by such counter circuit as will be later described. With this structure, as long as the reference timing is stabilized, regardless of the timing stability on the other side, the pulse width reproduction circuit 28 can output the stabilized vertical synchronizing signal 8 by taking place counting operation according to the set pulse width.

Figure 7:
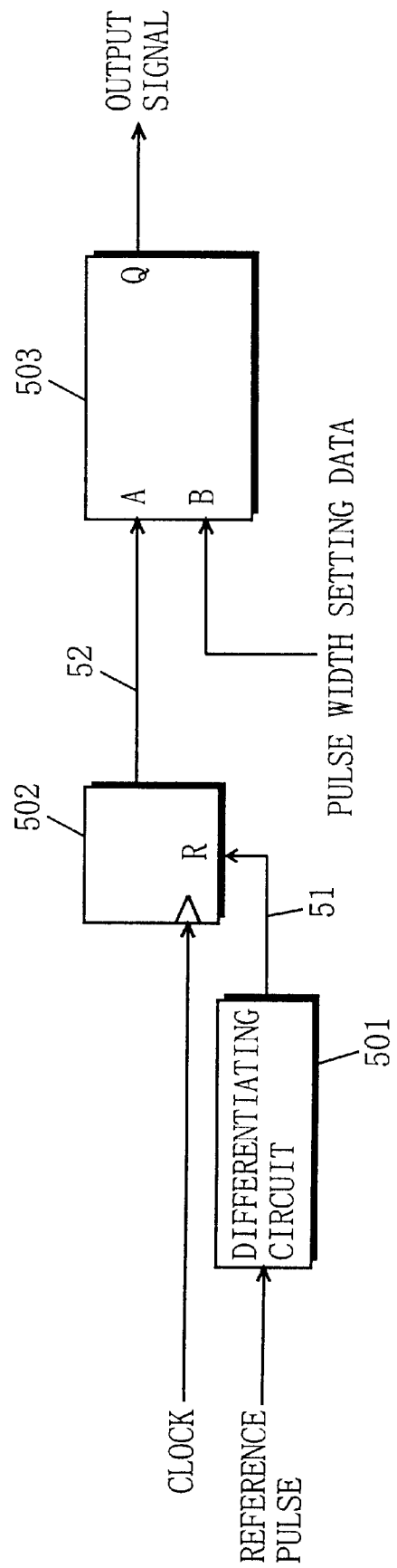
FIG. 7 is a block diagram showing an exemplary structure of a pulse width reproduction circuit in the second embodiment of the present invention.

Such pulse width reproduction circuit 28 is structurally described in detail with two examples next below. In a first example, the pulse width reproduction circuit 28 is structured as shown in FIG. 7. In FIG. 7, the pulse width reproduction circuit 28 includes a differentiating circuit 501 for receiving a reference pulse; a first counter 502 for receiving an output signal 51 from the differentiating circuit 501; and a comparator 503 for receiving an output signal 52 from the first counter 502 and pulse width setting data.

The first counter 502 resets its output signal to 0 when the signal 51 provided to a reset terminal, which is denoted by R in the drawing, is in the high level, and then outputs a value obtained by incrementing from 0 on the basis of an incoming clock. The comparator 503 compares in value between a value A provided by the first counter 502 and the pulse width setting data B. After the comparison, if A is smaller than B, the comparator 503 outputs a signal high in level. On the other hand, if A is B or larger, the comparator 503 outputs a signal low in level.

Figure 8:
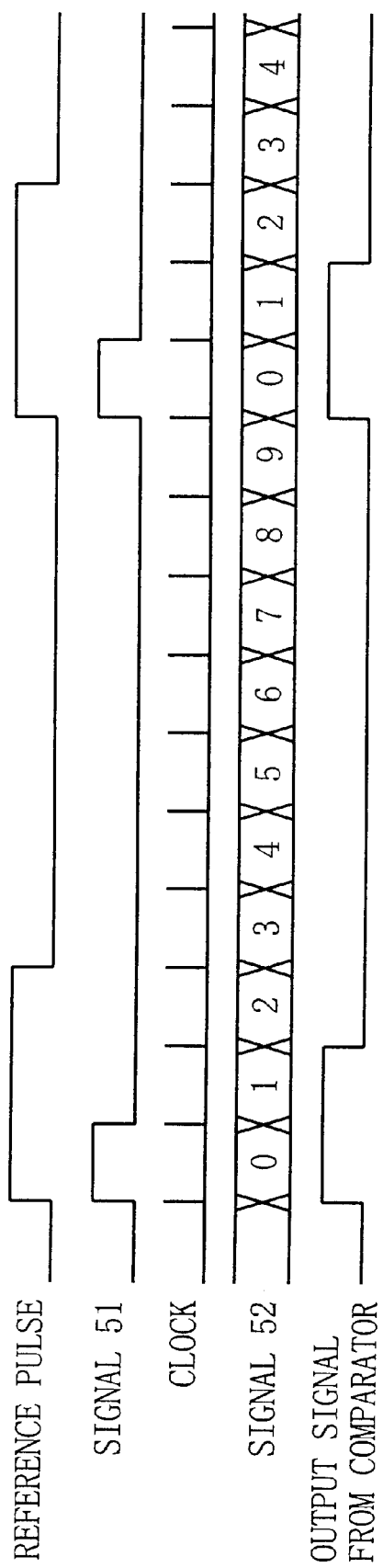
FIG. 8 is a time chart which explains the operation of the pulse width reproduction circuit in the second embodiment of the present invention.

FIG. 8 shows a timing chart which explains the operation of such pulse width reproduction circuit 28. In FIG. 8, the pulse width data is fixed to 2. Once the reference pulse is inputted, the differentiating circuit 501 outputs the signal 51 obtained by differentiating the inputted signal. After the signal 51 is inputted, the first counter 502 resets its counter value to 0, and then outputs the counter value obtained by incrementing from 0 in sync with an incoming clock. The comparator 503 monitors the value provided by the first counter 502, and keeps outputting a signal high in level until the value reaches 2 which is the pulse width setting data. When the value provided by the first counter 502 reached 2, the comparator 503 outputs a signal low in level. Thereafter, until the value provided from the first counter 502 returns to 0, the comparator 503 keeps outputting the signal low in level. By repeating such operation, the pulse width reproduction circuit 28 becomes capable of outputting a stabilized signal according to the set pulse width.

Figure 9:
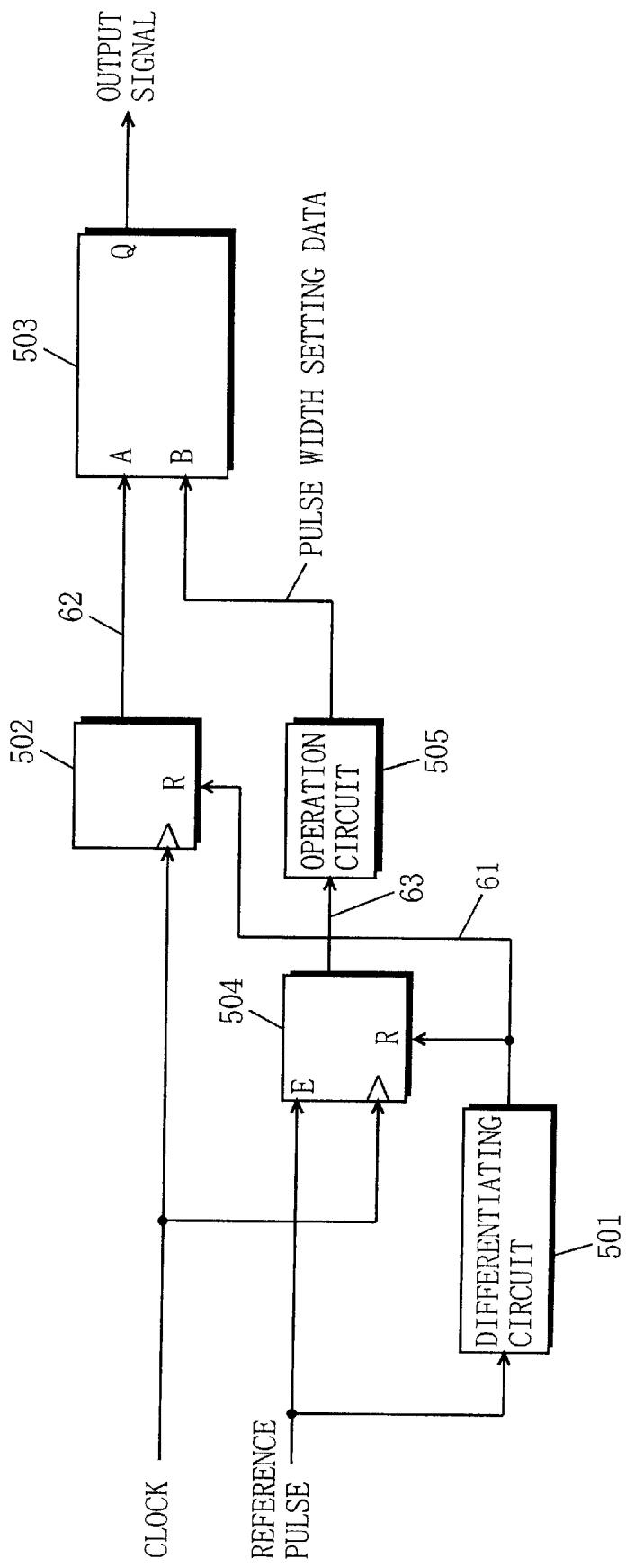
FIG. 9 is a block diagram showing an exemplary structure of the pulse width reproduction circuit in the second embodiment of the present invention.

In a second example, the pulse width reproduction circuit 28 is structured as shown in FIG. 9. In FIG. 9, the pulse width reproduction circuit 28 includes the differentiating circuit 501 for receiving the reference pulse; the first counter 502 for receiving an output signal 61 from the differentiating circuit 501; a second counter 504 for receiving the output signal 61 from the differentiating circuit 501 and the reference pulse; an operation circuit 505 for receiving an output signal from the second counter 504 and outputting the pulse width setting data; and the comparator 503 for receiving an output signal 62 from the first counter 502 and the pulse width setting data.

The pulse width reproduction circuit 28 in FIG. 9 is, compared with the one in FIG. 7, additionally provided with the second counter 504 and the operation circuit 505 to generate the pulse width setting data. Since the differentiating circuit 501, the first counter 502, and the comparator 503 in FIG. 9 are identical to those in FIG. 7, the same reference numerals are provided, and the structure and the operation thereof are not described again.

In FIG. 9, if the signal 61 provided to the reset terminal, which is denoted by R in the drawing, is high in level, the second counter 504 resets its output signal to 0. The second counter 504 outputs a counter value counted up from 0 on the basis of the incoming clock when the reference pulse provided to its enable terminal denoted by E in the drawing is high in level. If the reference pulse is low in level, the second counter 504 outputs the current counter value as it is without counting up.

Figure 10:
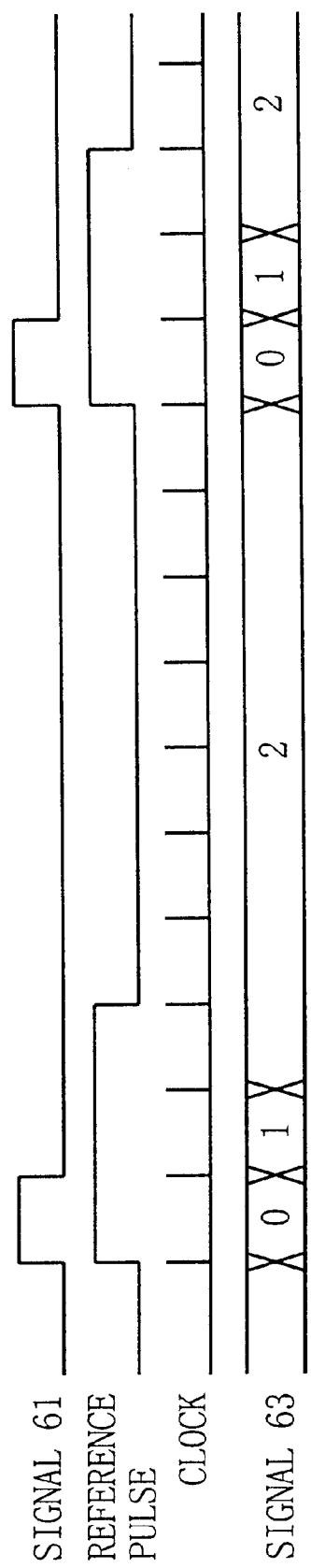
FIG. 10 is a time chart which explains the operation of the pulse width reproduction circuit in FIG. 9.

FIG. 10 shows a timing chart which explains the operation of such second counter 504. In FIG. 10, the differentiating circuit 501 outputs the signal 61 obtained by differentiating the inputted reference pulse. Once the signal 61 is provided, the second counter 504 resets its counter value to 0. At this time, since the reference pulse provided to the enable terminal of the second counter 504 is high in level, the second counter 504 outputs an signal 63 indicating the counter value incremented from 0 in sync with the incoming clock. Thereafter, when the reference pulse provided to the enable terminal becomes low in level, the second counter 504 outputs the signal 63 without changing it current counter value (2 in FIG. 10).

The operation circuit 505 performs operation with respect to the maximum value or most-frequent value of the counter value inputted from the second counter 504, and outputs a value obtained by the operation as the pulse width setting data. In FIG. 10, the maximum value of the counter value is 2 as is the most-frequent value. Accordingly, the operation circuit 505 sets the pulse width setting data to 2 for output. The comparator 503 operates similarly to the case in FIG. 7. By repeating such operation, the pulse width reproduction circuit 28 can output the stabilized signal according to the pulse width calculated based on the reference pulse.

Herein, the pulse width reproduction circuit 28 may take any structure as long as the pulse width to be outputted is changeable by arbitrarily setting the pulse width setting data, and thus above structure is not restrictive. Although the clock used in this pulse width reproduction circuit 28 is the horizontal synchronizing signal (or composite signal), it is not restrictive and the clock may be the one which is generated from the horizontal synchronizing signal in a PLL circuit.

As is known from the above, according to the synchronous processor circuit of the second embodiment which is additionally provided with the pulse width reproduction circuit 28 compared with the synchronous processor circuit of the first embodiment, the vertical synchronizing signal to be outputted therefrom can be more stabilized than the one from the synchronous processor circuit of the first embodiment.

(Third Embodiment)

Figure 11:
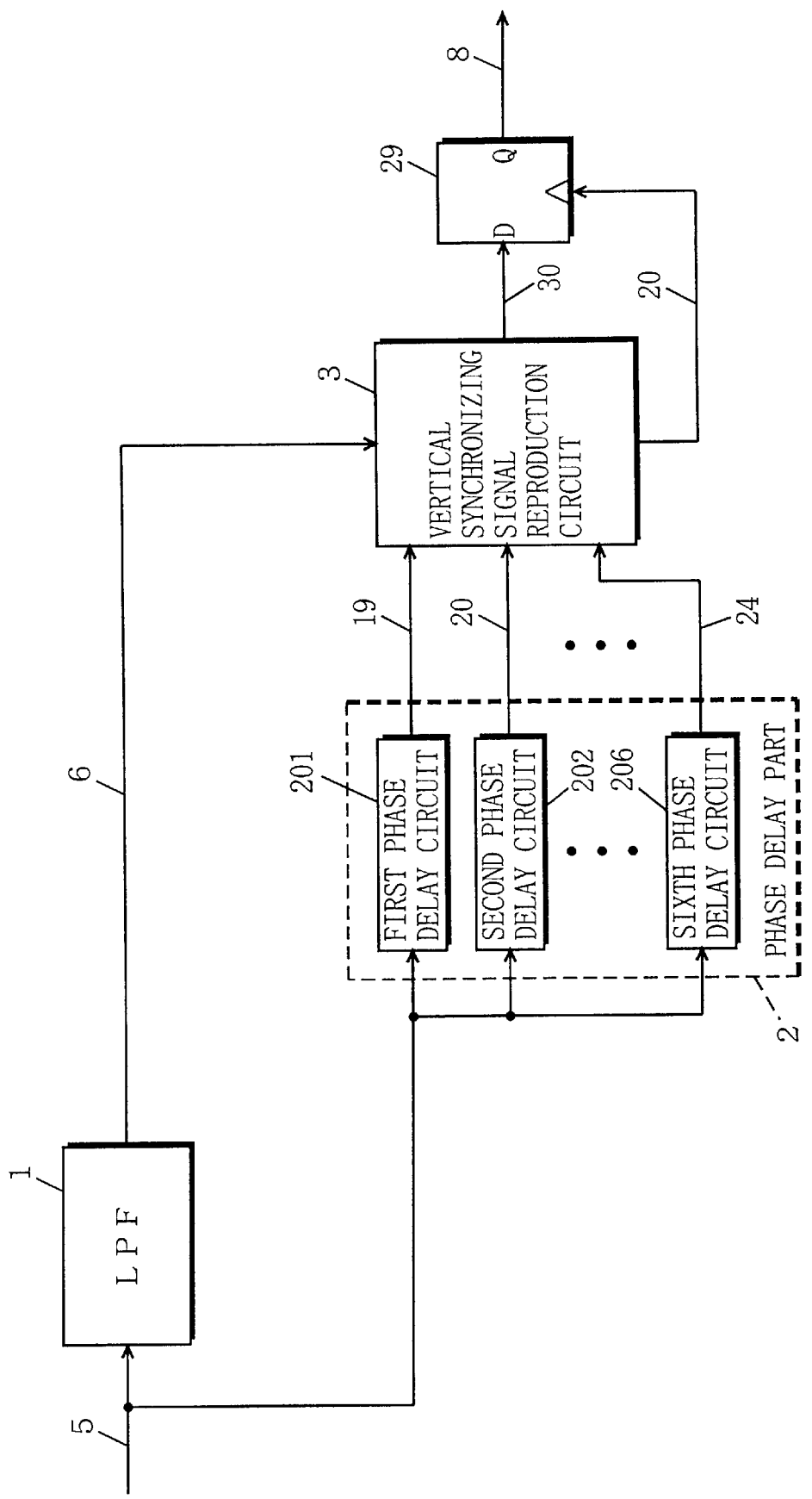
FIG. 11 is a block diagram showing the structure of a synchronous processor circuit in a third embodiment of the present invention.

FIG. 11 is a block diagram showing the structure of a synchronous processor circuit according to a third embodiment of the present invention. The synchronous processor circuit in FIG. 11 is structurally almost the same as the above-described synchronous processor circuit in FIG. 1. Note herein that, the synchronous processor circuit in FIG. 11 is not provided with the ½ frequency divider circuit but is additionally provided with a flip-flop 29 for receiving the output signal from the vertical synchronizing signal reproduction circuit 3 and the phase-delayed horizontal synchronizing signal 20. This is the only difference between the synchronous processor circuit in FIG. 11 and the above-described one in FIG. 1. Thus, any identical constituent is under the same reference numeral, and is not described again.

Next the flip-flop 29 newly provided in this embodiment is described. In the synchronous processor circuit of this embodiment, a signal 30 provided by the vertical synchronizing signal reproduction circuit 3 may not have a pulse width of the integral multiple of the frequency of the horizontal synchronizing signal as is described next below. Therefore, the synchronous processor circuit of this embodiment is additionally provided with flip-flop 29, and is so structured that the signal 30 provided by the vertical synchronizing signal reproduction circuit 3 goes to a data terminal of the flip-flop 29. Further, the synchronous processor circuit is so structured that the phase-delayed horizontal synchronizing signal 20 provided to either one of the terminals of multiplexer 18 arranged in the vertical synchronizing signal reproduction circuit 3 goes to a clock terminal of the flip-flop 29. With such structured synchronous processor circuit, the vertical synchronizing signal 8 can be a signal whose pulse width is the integral multiple of the horizontal synchronizing signal.

Figure 12:
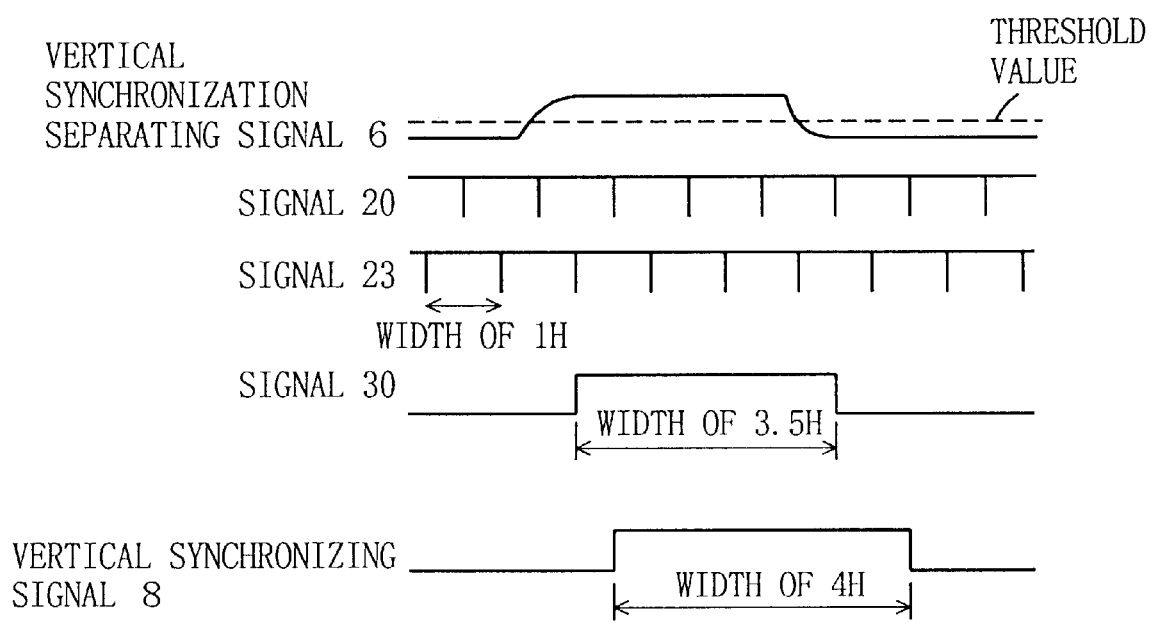
FIG. 12 is a time chart which explains the operation of the synchronous processor circuit in the third embodiment of the present invention.

FIG. 12 is a timing chart showing the case that the pulse width of the signal 30 provided by the vertical synchronizing signal reproduction circuit 3 does not become the integral multiple of that of the frequency of the horizontal synchronizing signal. With reference to FIG. 12, it is now described why the pulse width of the output signal from the flip-flop 29, i.e., the vertical synchronizing signal 8 becomes the integral multiple of that of the frequency of the horizontal synchronizing signal.

In FIG. 12, the signal 30 provided by the vertical synchronizing signal reproduction circuit 3 does not become constant in horizontal synchronization as described by referring to FIG. 15. In. FIG. 12, the phase-delayed horizontal synchronizing signals 20 and 23 presumably show a phase shift of 0.5 H therebetween. If so, the signal 30 outputted from the vertical synchronizing signal reproduction circuit 3 has the pulse width of 3.5 H. Herein, the flip-flop 29 has already received the phase-delayed horizontal synchronizing signal 20 in the clock terminal. Accordingly, the vertical synchronizing signal 8 is outputted from the flip-flop 29 with the same timing as the phase-delayed horizontal synchronizing signal 20. As such, the pulse width of the vertical synchronizing signal 8 outputted from the flip-flop 29 becomes the integral multiple of the pulse width of the phase-delayed horizontal synchronizing signal 20. In FIG. 12, the pulse width of the vertical synchronizing signal 8 is 4 H.

In this embodiment, the clock for the flip-flop 29 where the pulse width reproduction is carried out is the phase-delayed horizontal synchronizing signal 20. However, other phase-delayed horizontal synchronizing signals 19 and 21 to 24 lead to the similar effects. By taking this into consideration, the clock for the flip-flop 29 where pulse width reproduction is carried out may be a signal whose frequency is equal to that of the horizontal synchronizing signal, and is not restrictive to the phase-delayed horizontal synchronizing signal 20.

With such structured synchronous processor circuit according to the third embodiment of the present invention, the vertical synchronizing signal outputted therefrom can have the pulse width of the integral multiple of the horizontal synchronizing signal with a simplified circuit, thereby rendering the synchronous processor circuit in the display simplified.

(Fourth Embodiment)

Figure 13:
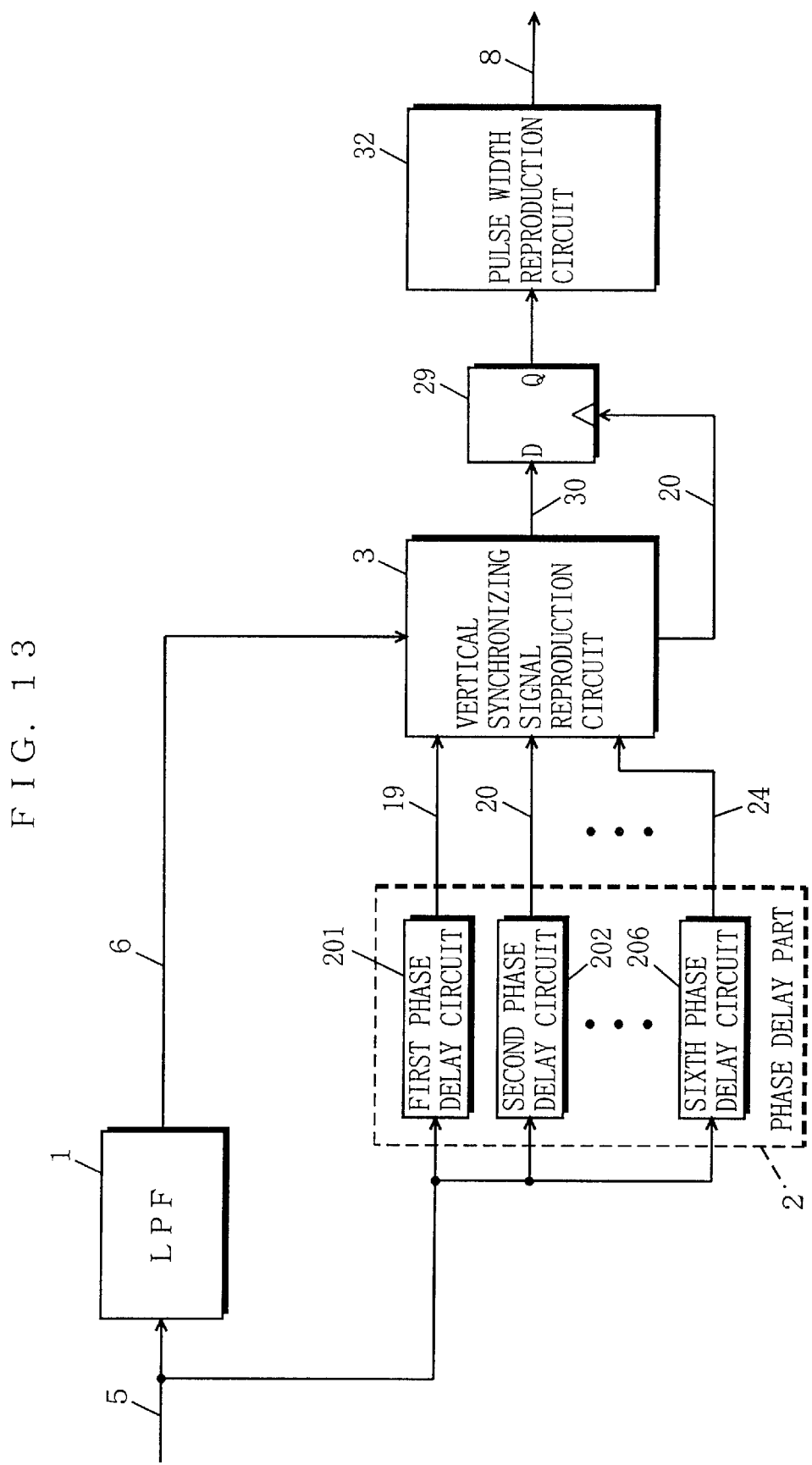
FIG. 13 is a block diagram showing the structure of a synchronous processor circuit in a fourth embodiment of the present invention.
Figure 14:
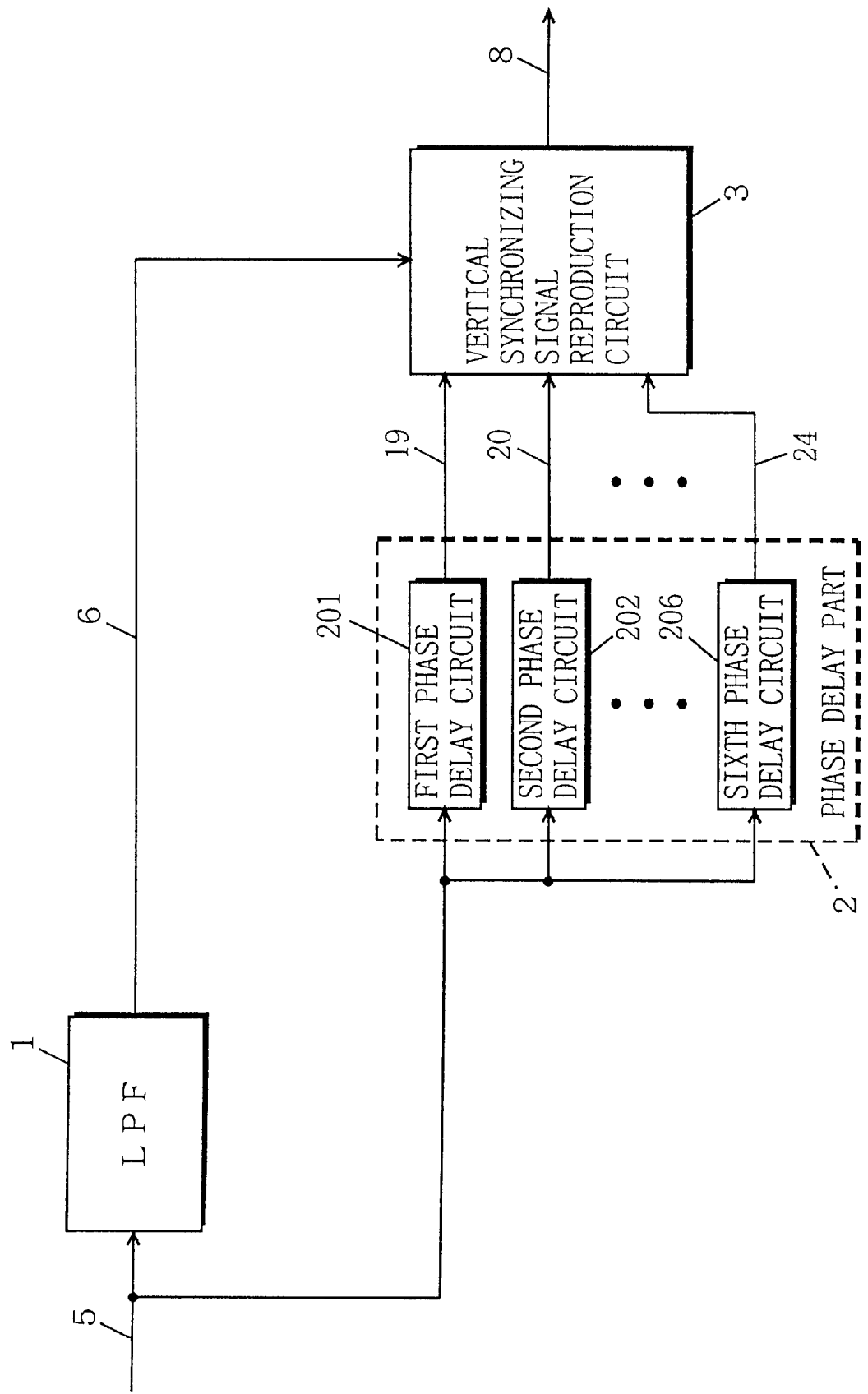
FIG. 14 is a block diagram showing the structure of a conventional synchronous processor circuit.

FIG. 13 is a block diagram showing the structure of a synchronous processor circuit according to a fourth embodiment of the present invention. The synchronous processor circuit in FIG. 13 is structurally almost the same as the above-described synchronous processor circuit in FIG. 11. The only difference between the synchronous processor circuit in FIG. 13 and the one in FIG. 11 is that a pulse width reproduction circuit 32 for receiving the output signal from the flip-flop 29 is additionally provided. Therefore, any identical constituent is under the same reference numeral, and is not described again.

Next, the reason why the pulse width reproduction circuit 32 is provided to the synchronous processor circuit of this embodiment is described. Herein, it is assumed that the display is applicable to interlace, and an interlace signal is provided to the synchronous processor circuit. In such case, the clock provided to the flip-flop 29 is in a ½ period, that is, a pulse signal of 0.5 H. Accordingly, the pulse width of the vertical synchronizing signal provided by the flip-flop 29 does not become the integral multiple of the horizontal synchronizing signal.

In this respect, in order to have the display applicable to interlace, it is conventionally known that a double-speed horizontal synchronizing signal generation circuit in which the frequency of the horizontal synchronizing signal is doubly multiplied so as to stabilize the phase relationship between the vertical synchronizing signal and the horizontal synchronizing signals. However, even if the interlace signal is handled in such conventional structure, the period of the clock to be provided to the flip-flop 29 remains ½ of the cycle of the horizontal synchronizing signal. Consequently, the pulse width of the vertical synchronizing signal from the flip-flop 29 does not become the integral multiple of the horizontal synchronizing signal.

Therefore, as shown in FIG. 13, the synchronous processor circuit of this embodiment is so structured that the output from the flip-flop 29 goes to the pulse width reproduction circuit 32. In FIG. 13, by arbitrarily setting the pulse width setting data, the pulse width reproduction circuit 32 can set the pulse width to be outputted to an even multiple of the clock to be provided to the flip-flop 29. In such manner, it becomes possible to always set the pulse width of the vertical synchronizing signal to be the integral multiple of the horizontal synchronizing signal while retaining the phase relationship between the horizontal synchronizing signals and the vertical synchronizing signal.

The structure of the pulse width reproduction circuit 28 is already described in detail by referring to FIGS. 7 and 9. As already described, as long as the pulse width to be outputted is changeable by arbitrarily setting the pulse width setting data, the pulse width reproduction circuit 28 may take any structure.

With such structured synchronous processor circuit of this embodiment, even with respect also to the interlace signal, the vertical synchronizing signal can have the pulse width of the integral multiple of the horizontal synchronizing signal with a simplified circuit. Therefore, it becomes possible to simplify the synchronous processor circuit in the display.

Lastly, those above-described synchronous processor circuits of the first to fourth embodiments are arranged in a display, and so structured as to reproduce a synchronizing signal from a composite signal provided by a video signal source for the display's synchronization stability. Such structure, however, is made for clarity of description, and thus the synchronous processor circuit is not restricted to the case that the composite signal is provided from the video signal source. As an example, the synchronous processor circuit may be used for a case where a polarized synchronizing signal is provided in combination with an amplifier where voltage is pumped up.

Industrial Applicability

With the present invention, a display's synchronization stability can be improved by determining the phase relationship between a vertical synchronizing signal and horizontal synchronizing signals, and a synchronous processor circuit arranged in the display can be simplified by setting a pulse width of the vertical synchronizing signal to be the integral multiple of the horizontal synchronizing signal.

What is claimed is:

1. A synchronous processor circuit arranged in a display for reproducing a synchronizing signal from a composite signal provided by a video signal source for stabilizing synchronization in the display, the circuit comprising:
    a low pass filter for outputting a vertical synchronization separating signal by separating a vertical synchronizing signal from said composite signal;
    a frequency divider circuit for outputting a vertical phase detection signal obtained by
    frequency-dividing said vertical synchronization separating signal into 1/n (where n is multiple of 2);
    a plurality of phase delay circuits for outputting phase-delayed signals each differently delayed in phase with respect to a horizontal synchronizing signal included in said composite signal; and
    a vertical synchronizing signal reproduction circuit for outputting said synchronizing signal having a phase relationship with said horizontal synchronizing signal determined by receiving said vertical synchronization separating signal, said vertical phase detection signal, and said plurality of phase-delayed signals.

2. The synchronous processor circuit according to claim 1, wherein said frequency divider circuit outputs the vertical phase detection signal obtained by dividing said vertical synchronizing signal into ½.

3. The synchronous processor circuit according to claim 1, wherein said vertical synchronizing signal reproduction circuit comprises:
    latch means for latching said vertical synchronization separating signal, and outputting said synchronizing signal having the phase relationship with said horizontal synchronizing signal determined;
    signal selection means for selecting a signal to be used by said latch means to latch said vertical synchronization separating signal from among said plurality of phase-delayed signals for output to said latch means; and
    signal selection control means for receiving said vertical phase detection signal and said plurality of phase-delayed signals, and outputting, to said signal selection means, a signal for controlling said signal selection control means which of said phase-delayed signals is selected therein.

4. The synchronous processor circuit according to claim 1, further comprising a pulse width reproduction circuit for receiving the signal from said vertical synchronizing signal reproduction circuit, and reproducing the synchronizing signal having a predetermined pulse width.

5. The synchronous processor circuit according to claim 4, wherein said pulse width reproduction circuit comprises:
    a counter, in which a counter value is set to 0 when the signal provided by said vertical synchronizing signal reproduction circuit rises, for incrementing the counter value according to an incoming clock signal; and
    a comparator for comparing pulse width setting data provided to set the pulse width and said counter value, and outputting a signal whose pulse width is based on said pulse width setting data.

6. A synchronous processor circuit arranged in a display for reproducing a synchronizing signal from a composite signal provided by a video signal source for stabilizing synchronization in the display, the circuit comprising:
    a low pass filter for outputting a vertical synchronization separating signal by separating a vertical synchronizing signal from said composite signal;
    a plurality of phase delay circuits for outputting phase-delayed signals each differently delayed in phase with respect to a horizontal synchronizing signal included in said composite signal; and
    a vertical synchronizing signal reproduction circuit for outputting a signal having the phase relationship with said horizontal synchronizing signal determined by receiving said vertical synchronization separating signal, and said plurality of phase-delayed signals; and
    a flip-flop for latching the signal provided by said vertical synchronizing signal reproduction circuit, and outputting said synchronizing signal whose period is the integral multiple of said horizontal synchronizing signal.

7. The synchronous processor circuit according to claim 6, wherein said vertical synchronizing signal reproduction circuit comprises:
    latch means for latching said vertical synchronizing separating signal and outputting the signal having the phase relationship with said horizontal synchronizing signal determined;
    signal selection means for selecting a signal to be used by said latch means to latch said vertical synchronization separating signal from among said plurality of phase-delayed signals for output to said latch means; and
    signal selection control means for receiving said vertical phase detection signal and said plurality of phase-delayed signals, and outputting, to said signal selection means, a signal for controlling said signal selection control means which of said phase-delayed signals selected therein.

8. The synchronous processor circuit according to claim 6, further comprising a pulse width reproduction circuit for receiving the signal from said flip-flop, and reproducing the synchronizing signal having a predetermined pulse width.

9. The synchronous processor circuit according to claim 8, wherein said pulse width reproduction circuit comprises:

a counter, in which a counter value is set to 0 when the signal provided by said flip-flop rises, for incrementing the counter value according to an incoming clock signal; and a comparator for comparing pulse width setting data provided to set the pulse width and said counter value, and outputting a signal whose pulse width is based on said pulse width setting data.

* * * * *